(12) United States Patent
Yang et al.

(10) Patent No.: US 9,815,157 B2
(45) Date of Patent: Nov. 14, 2017

(54) CIRCUMFERENTIAL POSITIONING DEVICE OF AUTOMOBILE HUB

(71) Applicant: CITIC Dicastal CO., LTD, Qinhuangdao (CN)

(72) Inventors: Jinling Yang, Qinhuangdao (CN); Li Yang, Qinhuangdao (CN); Liang Ma, Qinhuangdao (CN); Zhi Chen, Qinhuangdao (CN); Yongwang Zhao, Qinhuangdao (CN); Guoyuan Xiong, Qinhuangdao (CN); Zhihua Zhu, Qinhuangdao (CN); Zuo Xu, Qinhuangdao (CN)

(73) Assignee: CITIC Dicastal CO., LTD., Qinhuangdao (CN)

( * ) Notice: Subject to any disclaimer, the term of this patent is extended or adjusted under 35 U.S.C. 154(b) by 0 days.

(21) Appl. No.: 15/180,841

(22) Filed: Jun. 13, 2016

(65) Prior Publication Data
US 2016/0361787 A1 Dec. 15, 2016

(30) Foreign Application Priority Data
Jun. 12, 2015 (CN) .......................... 2015 1 0320242

(51) Int. Cl.
B23Q 1/00 (2006.01)
B23Q 3/14 (2006.01)
B23Q 3/06 (2006.01)
B23Q 16/04 (2006.01)
B23Q 16/06 (2006.01)

(52) U.S. Cl.
CPC ............... B23Q 3/14 (2013.01); B23Q 3/062 (2013.01); B23Q 16/043 (2013.01); B23Q 16/06 (2013.01)

(58) Field of Classification Search
CPC ........ B23Q 3/14; B23Q 3/062; B23Q 16/043; B23Q 16/06
See application file for complete search history.

(56) References Cited

U.S. PATENT DOCUMENTS

2007/0221337 A1* 9/2007 Sammartin ............ B23Q 3/183
157/14

* cited by examiner

*Primary Examiner* — Larry E Waggle, Jr.
*Assistant Examiner* — Nirvana Deonauth
(74) *Attorney, Agent, or Firm* — Maier & Maier, PLLC

(57) ABSTRACT

A circumferential positioning device of automobile hub having rotary positioning seat, transition seat, bearing, positioning pin, positioning cylinder, bearing, base frame, main rotating shaft with sliding spline, coupling assembly, link snap-gauge assembly, lead screw, connecting bolt, nut, servo motor, lower bracket of main rotating shaft, small bracket of belt servo motor, belt pulley servo motor, small belt pulley axle, small belt pulley, belt, large belt pulley. The device in the present invention two radial grooves passing through the center that are formed in the bottom surface of the flange of the hub, correspond to the spoke direction on the facade of the hub and are just matched with the two radial bosses passing through the center on the top face of the positioning seat to achieve a positioning purpose.

1 Claim, 1 Drawing Sheet

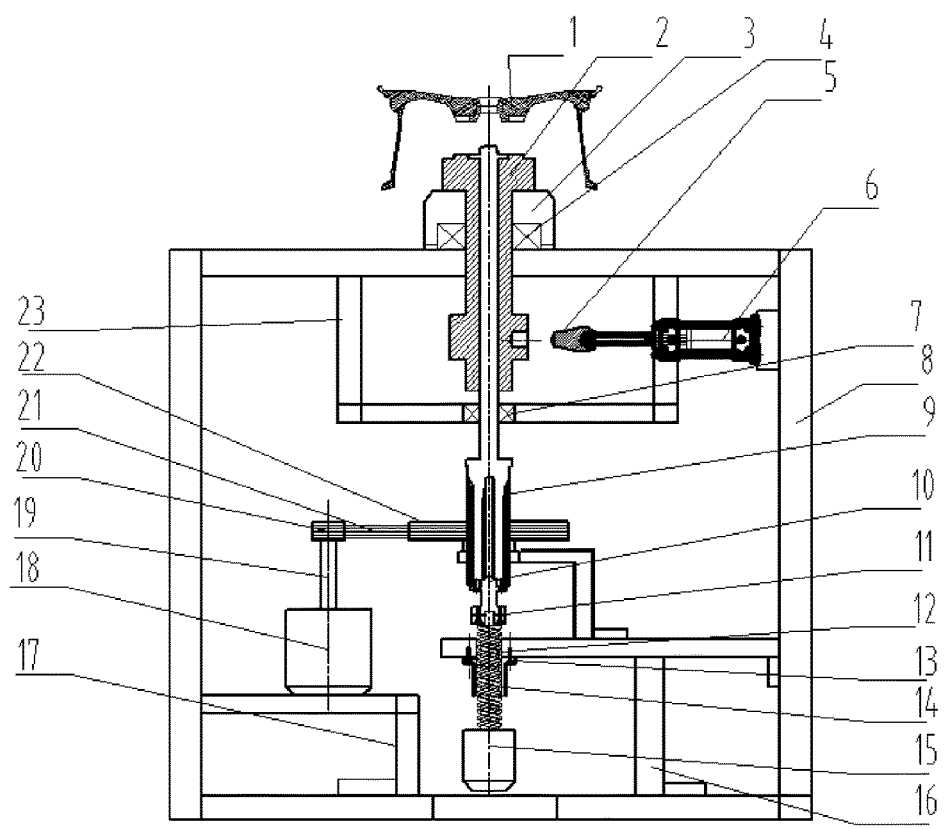

CIRCUMFERENTIAL POSITIONING DEVICE OF AUTOMOBILE HUB

TECHNICAL FIELD

The present invention belongs to a positioning device technology in the field of machine manufacturing, and particularly relates to a circumferential positioning device of an automobile hub.

BACKGROUND ART

A hub is composed of a plurality of windows and a plurality of spokes, a flange is connected with a rim through the spokes, facades between the spokes are hollow, namely the windows, and in a production and machining procedure, the hub requires axial positioning and requires positioning along the spoke direction or the window direction, so as to guarantee machining demands.

SUMMARY OF THE INVENTION

The purpose of the present invention is to provide a circumferential hub positioning device, so that automatic production is convenient to achieve; moreover, a final effect of lowering the cost and reducing human resources is achieved.

The following technical solutions are provided in the present invention:

A circumferential positioning device of automobile hub comprising rotary positioning seat (2), transition seat (3), bearing (4), positioning pin (5), positioning cylinder (6), bearing (7), base frame (8), main rotating shaft with sliding spline (9), coupling assembly (10), link snap-gauge assembly (11), lead screw (12), connecting bolt (13), nut (14), servo motor (15), lower bracket of main rotating shaft (16), small bracket of belt servo motor (17), belt pulley servo motor (18), small belt pulley axle (19), small belt pulley (20), belt (21), large belt pulley (22), and upper bracket of main rotating shaft (23), characterized in that, the rotary positioning seat (2), transition seat (3) and bearing (4) are fixed on base frame (8); positioning pin (5) is connected to positioning cylinder (6), and positioning cylinder (6) is fixed on base frame (8) and upper bracket of main rotating shaft (23); main rotating shaft with sliding spline (9), coupling assembly (10) and lead screw (12) are fixed inside the base frame (8), and they are fixedly rotated with upper bracket of main rotating shaft (23) and lower bracket of main rotating shaft (16); belt pulley servo motor (18) drives a small belt pulley axle (19) to drive a small belt pulley (20) to rotate, and a large belt pulley (22) is connected with the small belt pulley (20) through a belt (21); the main rotating shaft (9) with the sliding spline is connected with the large belt pulley (22) through internal and external splines; The large belt pulley (22) rotates to drive the main rotating shaft (9) with the sliding spline to rotate in a bearing (7), a servo motor (15) is connected with the lead screw (12), the lead screw (12) is connected with the main rotating shaft (9) with the sliding spline through the coupling assembly (10), a nut (14) is fixed on the lower bracket (16) of the main rotating shaft through a connecting bolt (13), and the lead screw (12) is driven by the rotation of the servo motor (15) to move up and down in the nut (14), so as to drive the main rotating shaft (9) with the sliding spline to move up and down; the link snap-gauge assembly (11) is located in the coupling assembly (10).

The present invention also provides the following technical solutions:

1. two grooves, which pass through the center of a center hole to locate on the same straight line and are formed in the bottom surface of the flange of the hub, just match with and correspond to two bosses which pass through a center line on the top face of a positioning seat (2), and 2. a main rotating shaft (9) with a sliding spline is connected with a lead screw (12) through a coupling assembly (10), and a link snap-gauge assembly (11) is located in the coupling assembly (10) to ensure that the lead screw (12) and the main rotating shaft (9) with the sliding spline can only move up and down while cannot be mutually driven to rotate.

In another aspect, the technical solution of the present invention is as follows: the circumferential positioning device of the automobile hub is mainly composed as follows: the rotary positioning seat (2), a transition seat (3) and a bearing (4) are installed on a base frame (8). A positioning pin (5) is connected with a positioning cylinder (6), and the positioning cylinder (6) is fixed on the base frame (8) and a small bracket (23). The main rotating shaft (9) with the sliding spline, the coupling assembly (10) and the lead screw (12) are fixed in the base frame (8) and are fixedly rotated with an upper bracket 23 of the main rotating shaft and a lower bracket (16) of the main rotating shaft. Power generated by a belt pulley servo motor (18) drives a small belt pulley axle (19) to drive a small belt pulley (20) to rotate, and a large belt pulley (22) is connected with the small belt pulley (20) through a belt (21) and rotates together with the small belt pulley (20) through the rotation of the small belt pulley (20). The main rotating shaft (9) with the sliding spline is connected with the large belt pulley (22) through internal and external splines. The large belt pulley (22) rotates to drive the main rotating shaft (9) with the sliding spline to rotate in a bearing (7), a servo motor (15) is connected with the lead screw (12), the lead screw (12) is connected with the main rotating shaft (9) with the sliding spline through the coupling assembly (10), a nut (14) is fixed on the lower bracket (16) of the main rotating shaft through a connecting bolt (13), and the lead screw (12) is driven by the rotation of the servo motor (15) to move up and down in the nut (14), so as to drive the main rotating shaft (9) with the sliding spline to move up and down. The link snap-gauge assembly (11) is located in the coupling assembly (10) to ensure that the lead screw (12) and the main rotating shaft (9) with the sliding spline can only move up and down while cannot be mutually driven to rotate. Two radial grooves passing through the center are formed in the bottom surface of the flange of the hub, correspond to the spoke direction on the facade of the hub and are just matched with the two radial bosses passing through the center on the top face of the positioning seat (2) to achieve a positioning purpose.

BRIEF DESCRIPTION OF THE DRAWINGS

FIG. 1 is a front view of a circumferential hub positioning device in the present invention;

in the FIGURE: 1—hub, 2—rotary positioning seat, 3—transition seat, 4—bearing, 5—positioning pin, 6—positioning cylinder, 7—bearing, 8—base frame, 9—main rotating shaft with sliding spline, 10—coupling assembly, 11—link snap-gauge assembly, 13—connecting bolt, 14—nut, 15—servo motor, 16—lower bracket of main rotating shaft, 17—small bracket of belt servo motor, 18—belt pulley servo motor, 19—small belt pulley axle, 20—small belt pulley, 21—belt, 22—large belt pulley, and 23—upper bracket of main rotating shaft.

DETAILED DESCRIPTION OF THE EMBODIMENTS

In an embodiment of the invention, a circumferential positioning device of automobile hub comprises rotary positioning seat (2), transition seat (3), bearing (4), positioning pin (5), positioning cylinder (6), bearing (7), base frame (8), main rotating shaft with sliding spline (9), coupling assembly (10), link snap-gauge assembly (11), lead screw (12), connecting bolt (13), nut (14), servo motor (15), lower bracket of main rotating shaft (16), small bracket of belt servo motor (17), belt pulley servo motor (18), small belt pulley axle (19), small belt pulley (20), belt (21), large belt pulley (22), and upper bracket of main rotating shaft (23), characterized in that, the rotary positioning seat (2), transition seat (3) and bearing (4) are fixed on base frame (8); positioning pin (5) is connected to positioning cylinder (6), and positioning cylinder (6) is fixed on base frame (8) and upper bracket of main rotating shaft (23); main rotating shaft with sliding spline (9), coupling assembly (10) and lead screw (12) are fixed inside the base frame (8), and they are fixedly rotated with upper bracket of main rotating shaft (23) and lower bracket of main rotating shaft (16); belt pulley servo motor (18) drives a small belt pulley axle (19) to drive a small belt pulley (20) to rotate, and a large belt pulley (22) is connected with the small belt pulley (20) through a belt (21); the main rotating shaft (9) with the sliding spline is connected with the large belt pulley (22) through internal and external splines; The large belt pulley (22) rotates to drive the main rotating shaft (9) with the sliding spline to rotate in a bearing (7), a servo motor (15) is connected with the lead screw (12), the lead screw (12) is connected with the main rotating shaft (9) with the sliding spline through the coupling assembly (10), a nut (14) is fixed on the lower bracket (16) of the main rotating shaft through a connecting bolt (13), and the lead screw (12) is driven by the rotation of the servo motor (15) to move up and down in the nut (14), so as to drive the main rotating shaft (9) with the sliding spline to move up and down; the link snap-gauge assembly (11) is located in the coupling assembly (10) so as to ensure that the lead screw (12) moves upwards or downwards regarding the main rotating shaft with sliding spline (9), instead of rotating regarding the same.

The small belt pulley (20), the belt (21), and the large belt pulley (22) are driven to rotate by the power of the servo motor (18), and then the main rotating shaft (9) with the slide spline is driven to rotate, the lead screw (12) is driven to move upward within the nut (14) by rotation of the servo motor (15), so that the main rotating shaft with the slide spline moves upward to jack up the hub (1) and rotates together, under drive of the servo motor (18), the small belt pulley (20), the belt (21) and the large belt pulley (22) are rotated, and then the main rotating shaft (9) with the belt slide spline is driven to rotate, the lead screw is driven to move downward within the nut (14) by rotation of the servo motor (15), so that the main rotating shaft with the slide spline moves downward to descend the hub (1) and rotates together, the bottom surface of the flange of the hub is provided with the two grooves on one straight line, which are just positioned in place with the two bosses on one straight line on the top surface of the positioning seat (2). The grooves under the flange of the hub (1) are gradually matched with the bosses on the positioning seat (2) along with the hub (1), the process is implemented the same as the engaging process of a pair of gears. After rotation of the rotary positioning seat (2) for a few cycles, the positioning cylinder (6) is driven by a gas source, and the positioning pin (5) is gradually inserted into a positioning hole of the rotary positioning seat (2) to achieve a purpose of circumferentially positioning the hub (1).

The invention claimed is:

1. A circumferential positioning device of an automobile hub comprising: rotary positioning seat, a transition seat, a first bearing, a positioning pin, a positioning cylinder, a second bearing a base frame, a main rotating shaft with a sliding spline, a coupling assembly, a link snap-gauge assembly, a lead screw, a connecting bolt, a nut, a servo motor, a lower bracket of the main rotating shaft, a small bracket of a belt servo motor, a belt pulley servo motor, a small belt pulley axle, a small belt pulley, a belt, a large belt pulley, and an upper bracket of the main rotating shaft, wherein the rotary positioning seat, transition seat and bearing are fixed on the base frame; the positioning pin is connected to the positioning cylinder, and the positioning cylinder is fixed on the base frame and the upper bracket of the main rotating shaft; the main rotating shaft with the sliding spline, the coupling assembly and the lead screw are fixed inside the base frame, and they are fixedly rotated with the upper bracket of the main rotating shaft and the lower bracket of the main rotating shaft; the belt pulley servo motor drives the small belt pulley axle to drive the small belt pulley to rotate, and the large belt pulley is connected with the small belt pulley through the belt; the main rotating shaft with the sliding spline is connected with the large belt pulley through internal and external splines; the large belt pulley rotates to drive the main rotating shaft with the sliding spline to rotate in the second bearing, the servo motor is connected with the lead screw, the lead screw is connected with the main rotating shaft with the sliding spline through the coupling assembly, the nut is fixed on the lower bracket of the main rotating shaft through the connecting bolt, and the lead screw is driven by the rotation of the servo motor to move up and down in the nut, so as to drive the main rotating shaft with the sliding spline to move up and down; the link snap-gauge assembly is located in the coupling assembly.

* * * * *